US008975562B2

(12) United States Patent
Galbreath et al.

(10) Patent No.: US 8,975,562 B2
(45) Date of Patent: Mar. 10, 2015

(54) OVER THE RANGE MICROWAVE SAFETY DOOR

(75) Inventors: Patrick D. Galbreath, Louisville, KY (US); Brian Henninger, Malabar, FL (US)

(73) Assignee: General Electric Company, Schenectady, NY (US)

( * ) Notice: Subject to any disclaimer, the term of this patent is extended or adjusted under 35 U.S.C. 154(b) by 823 days.

(21) Appl. No.: 13/099,666

(22) Filed: May 3, 2011

(65) Prior Publication Data

US 2012/0279957 A1 Nov. 8, 2012

(51) Int. Cl.

| | |
|---|---|
| ***H05B 6/76*** | (2006.01) |
| ***B32B 17/00*** | (2006.01) |
| ***C03C 27/00*** | (2006.01) |
| ***B32B 37/00*** | (2006.01) |
| ***B31F 1/22*** | (2006.01) |
| ***B44C 1/17*** | (2006.01) |
| ***B29C 65/00*** | (2006.01) |
| ***C04B 37/00*** | (2006.01) |
| ***B32B 17/10*** | (2006.01) |
| ***B32B 17/06*** | (2006.01) |
| ***B32B 9/00*** | (2006.01) |
| ***B29C 35/08*** | (2006.01) |
| ***H05B 6/64*** | (2006.01) |

(52) U.S. Cl.

CPC ...................................... *H05B 6/766* (2013.01)
USPC ........... 219/740; 219/736; 219/737; 219/738; 219/739; 156/99; 156/106; 156/208; 156/241; 156/274.8; 156/275.7; 156/325; 428/432; 428/415; 428/417; 428/426; 428/427; 428/428; 428/429; 428/430; 428/431; 264/405; 264/417

(58) Field of Classification Search

CPC .......... H05B 6/766; H05B 6/763; H05B 6/76; H05B 6/6414; B32B 27/36; B32B 2367/00; C03C 17/3405; C03C 2217/485
USPC ............ 219/740, 736, 737, 738–739; 156/99, 156/106, 208, 241, 274.8, 275.7, 325; 428/432, 415, 417, 426–431; 264/405, 264/417
See application file for complete search history.

(56) References Cited

U.S. PATENT DOCUMENTS

| | | | | | |
|---|---|---|---|---|---|
| 2,818,606 | A | * | 1/1958 | White | 264/171.24 |
| 2,958,754 | A | * | 11/1960 | Hahn | 219/740 |
| 3,304,401 | A | * | 2/1967 | Long | 219/740 |
| 3,334,008 | A | * | 8/1967 | Park et al. | 428/429 |
| 3,509,015 | A | * | 4/1970 | Ammons et al. | 428/425.6 |
| 3,654,417 | A | * | 4/1972 | Javes et al. | 219/757 |
| 3,731,035 | A | * | 5/1973 | Jarvis et al. | 219/740 |
| 3,808,077 | A | * | 4/1974 | Rieser et al. | 156/102 |
| 3,864,204 | A | * | 2/1975 | Shorr et al. | 428/213 |
| 4,008,383 | A | * | 2/1977 | Tanaka et al. | 219/740 |
| 4,125,669 | A | * | 11/1978 | Triebel et al. | 428/412 |
| 4,215,258 | A | * | 7/1980 | Nelson et al. | 219/740 |
| 4,234,533 | A | * | 11/1980 | Langlands | 264/261 |
| 4,264,681 | A | * | 4/1981 | Girard et al. | 428/429 |
| 4,264,800 | A | * | 4/1981 | Jahnke et al. | 219/740 |
| 4,513,879 | A | * | 4/1985 | Reiss | 221/150 HC |

(Continued)

*Primary Examiner* — Dana Ross
*Assistant Examiner* — Gyounghyun Bae
(74) *Attorney, Agent, or Firm* — Fay Sharpe LLP

(57) ABSTRACT

Apparatus and methods are disclosed for a safety door of an oven having glass therein with a plastic laminate. The safety door retains glass within the door in order to prevent glass from falling or being forced outside of the oven, which may cause injury.

13 Claims, 4 Drawing Sheets

(56) References Cited

U.S. PATENT DOCUMENTS

| | | | | | |
|---|---|---|---|---|---|
| 4,739,690 | A * | 4/1988 | Moskowitz | 89/36.02 |
| 5,264,286 | A * | 11/1993 | Ando et al. | 428/432 |
| 5,346,770 | A * | 9/1994 | Osada et al. | 428/432 |
| 5,462,805 | A * | 10/1995 | Sakamoto et al. | 428/430 |
| 5,645,940 | A * | 7/1997 | Teddington et al. | 428/430 |
| 5,981,927 | A * | 11/1999 | Osepchuk et al. | 219/740 |
| 6,528,772 | B1 * | 3/2003 | Graves et al. | 219/680 |
| 6,987,252 | B2 * | 1/2006 | Graves et al. | 219/681 |
| 7,022,957 | B2 * | 4/2006 | Bakanowski et al. | 219/741 |
| 7,030,349 | B1 * | 4/2006 | Graves et al. | 219/758 |
| 7,053,348 | B1 | 5/2006 | Terada et al. | |
| 7,121,380 | B2 * | 10/2006 | Garnier et al. | 181/286 |
| 7,135,217 | B2 * | 11/2006 | Lansberry | 428/195.1 |
| 7,332,216 | B2 * | 2/2008 | Hashimoto et al. | 428/331 |
| 7,348,527 | B2 * | 3/2008 | Braunisch et al. | 219/757 |
| 7,470,401 | B2 * | 12/2008 | Morales | 422/65 |
| 7,817,328 | B2 * | 10/2010 | Millett et al. | 359/288 |
| 7,838,115 | B2 * | 11/2010 | Lewno | 428/425.6 |
| 7,854,990 | B2 * | 12/2010 | Komori | 428/354 |

* cited by examiner

OVER THE RANGE MICROWAVE SAFETY DOOR

BACKGROUND

The subject disclosure relates generally to cooking appliances, and more particularly, to microwave ovens, such as Over-the Range (OTR) microwave ovens having a safety door that prevents glass in case of breakage from falling outside.

An Over-the-Range (OTR) microwave oven is a home appliance that is installed on a wall surface, often in an upper space portion of a range installed in the kitchen and is used to cook using microwave radiation in a heating cavity while also exhausting cooking fumes and pollution from the cooktop below (i.e., performing a ventilation function). Because of the exhaust function of an OTR oven, the location is generally around eye level of a person cooking in a kitchen in order to ventilate any gas or fumes generated. While OTR's can be made and function very safely, some problems regarding safety can arise.

For example, OTR ovens are typically like most microwaves in that the door has a window within for viewing an item that is being cooked. The window on the oven is helpful for many reasons, such as viewing food to see if it is done and prevent overcooking. However, for different reasons, the glass window in the door can break, shatter or customer perceive to "explode," which can be detrimental to health for such an event to occur at eye level and above cooking food. In particular, the door glass pieces can fall out of the door and into the food being cooked on the cooktop, user's eyes, or floor where it can be stepped on by user or a pet. Breaks in the glass can occur for multiple reasons. For example, door glass can be broken from something or someone striking it, a door design defect, or what is sometime referred to as a "spontaneous" breakage which has been sometimes attributed to impurities in the glass. In at least one case of spontaneous breakage, the door glass can fracture as a result of NiS contaminates in the glass. As homes cool at night, the glass may contract at different rates in areas having non-uniformities in composition. When the non-uniformities within the glass composition respond differently to temperature differentials, then glass within the door can unexpectedly shatter due to the created stress concentration.

As a result, incentives are needed for manufacturers to provide safer OTR microwave ovens with the same benefits that users continue to demand. For example, safety glass designs are needed. Therefore, the present disclosure provides apparatus and methods for improving the safety of a microwave oven.

BRIEF DESCRIPTION OF THE DISCLOSURE

Apparatus and methods are disclosed to dispose a layer of plastic in between or on one side of one or more pieces of glass within an oven door for safety. The glass is adhered to a plastic layer to prevent a cut hazard to a consumer or user of the oven. Door glass can be broken from something striking the glass, a door design defect, or spontaneous breakage, such as with NiS contaminates residing within the glass.

In one embodiment, an apparatus includes a magnetron that provides radiation energy, and a heating cavity comprises a cavity wall with an opening that exposes the heating cavity to the radiation from the magnetron for cooking an item therein. A safety door provides access to the heating cavity for placing the item therein and has a glass window that is at least partially transparent to see within the heating cavity. The glass window includes a first glass layer, a second glass layer and a plastic laminate bonding to at least one side of at least one of the first glass layer and the second glass layer. In certain embodiments, the plastic laminate includes biaxially-oriented polyethylene terephthalate. The door is configured to retain substantially all glass of the glass window within the door and/or within the heating cavity at all times and during any break in the glass window.

In another embodiment, a method is disclosed for an over-the-range (OTR) oven. A door is provided to the OTR oven that seals radiation generated from a magnetron within a heating cavity upon closing. A first glass layer is provided within the door that is at least partially transparent. A second glass layer is provided that is laterally adjacent the first glass layer within the door and closer to the heating cavity. A plastic laminate is disposed to the first glass layer in order to retain glass within the door or within the heating cavity from the first glass layer upon a break therein occurring.

Still other features and benefits of the present disclosure will become apparent from reading and understanding the following detailed description.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION

An apparatus having a safety door with a safety glass window therein is disclosed, such as an Over-the-Range (OTR) microwave. The disclosure is not limited to any one particular appliance or device, but particular reference is made to OTR microwave ovens having a safety door. The door of the OTR includes a safety glass having an added layer of plastic therein. The glass of the window is adhered to the plastic with an adhesion layer so that the glass within the door sticks to the plastic at all times. Under the stress of a fracture or break, the glass remains within the door or in the microwave cavity resulting in no harm to anything outside of the oven from the glass.

Figure 1:
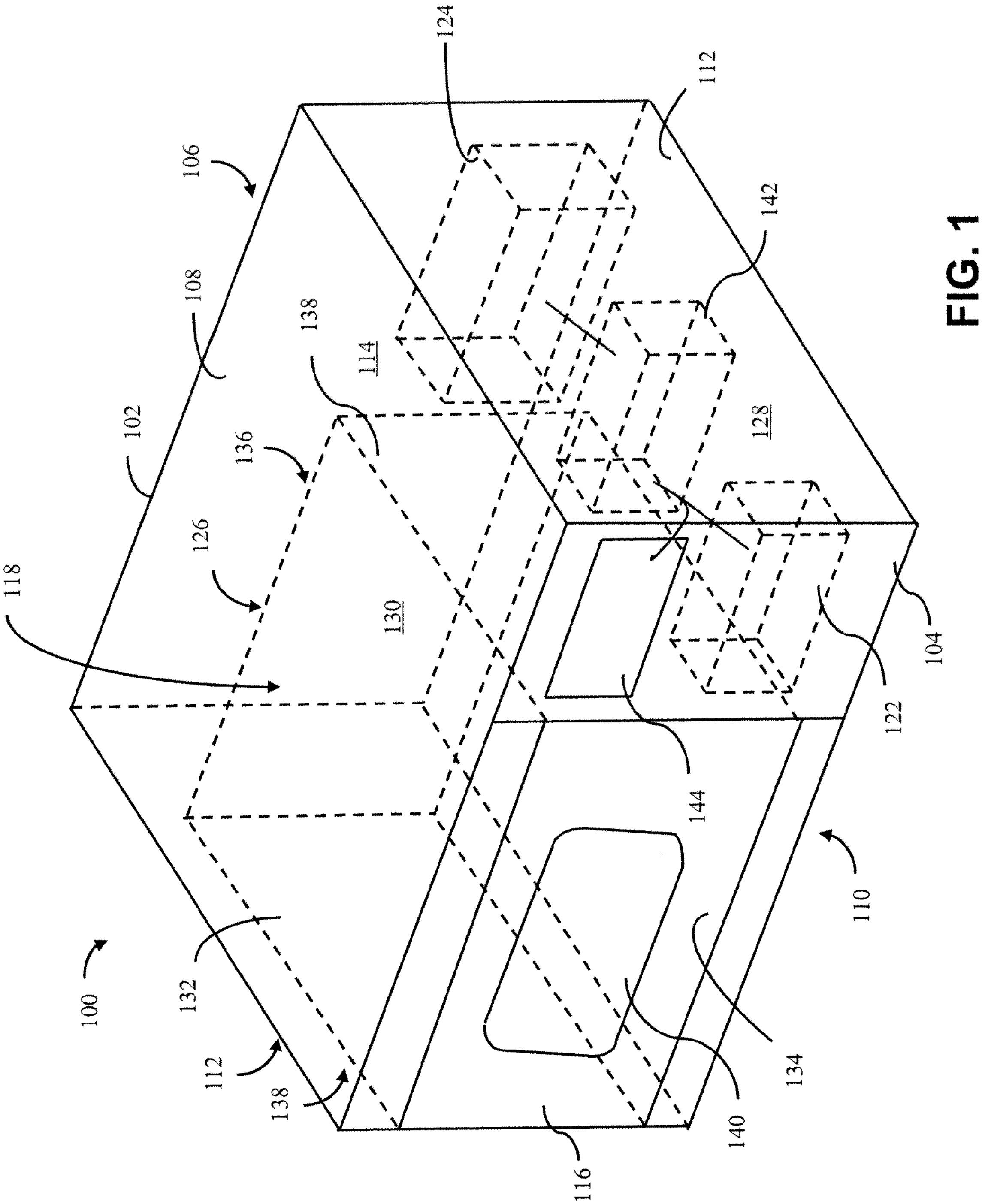
FIG. 1 is a front, perspective view of a cooking appliance such as a microwave oven in which is implemented an exemplary embodiment of a safety door.

FIG. 1 illustrates an aspect of an exemplary oven 100, such as an OTR microwave or the like. The oven 100 includes an outer housing 102 generally configured to permit placement of the oven 100 on a counter or secured to kitchen cabinetry or a kitchen wall. The outer housing 102 is configured with a front panel 104, a rear wall 106, a top wall 108, a bottom wall 110, and pair of opposed side walls 112. Combined together the walls of the outer housing 102 form an interior cabinet 114, accessed by way of a door 116 and which surrounds a heating cavity 118 and components such as a power supply 122 and an RF generation module or a magnetron 124.

The heated cavity 118 also includes a cavity wall 126 that serves to separate the interior cabinet 114 into a component compartment 128 and a cooking compartment 130, the latter is provided to subject food to radiation from the magnetron 124. The cavity wall 126 in this example includes a top cavity wall 132, a bottom cavity wall 134, a rear cavity wall 136, and a pair of opposed side cavity walls 138.

The oven 100 has a controller 142 that is operatively associated with power consuming feature/functions of the oven 100. The controller 142 can include a micro computer on a printed circuit board, which is programmed to selectively control energizing of the power consuming feature/functions. The oven 100 has a control panel 144 for receiving and operating control instructions for cooking.

In one embodiment, the door 116 is mounted within a door frame and has a glass window 140 located in the door 116 for viewing food in the oven cooking cavity 126. The door 116 is adapted to retain glass within the door 116 in the event of a fracture or break occurring. For example, when a fracture occurs the glass sticks to a plastic layer that is within the door and bonded to the glass window 140.

Figure 2:
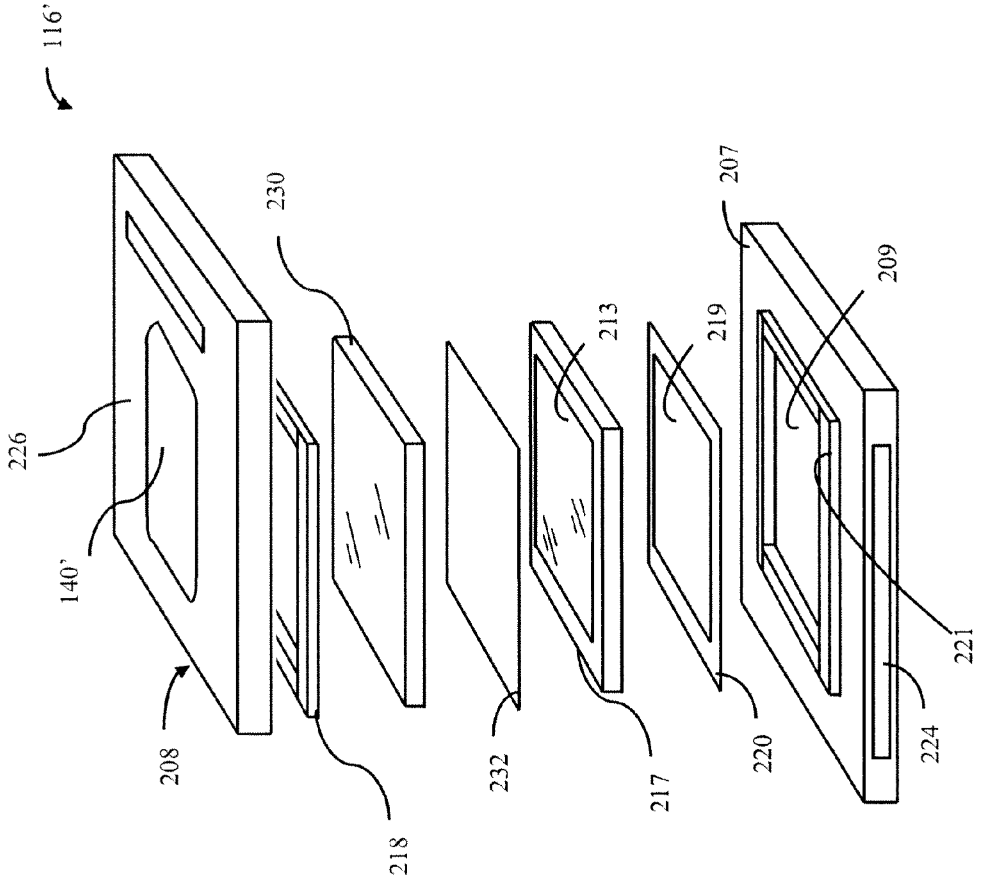
FIG. 2 is a perspective view show relevant portions of a safety door for an oven according to an exemplary aspect of the present disclosure.

As shown in FIG. 2, is illustrated an exemplary aspect of a door 116' for an appliance, such as an OTR microwave or other like apparatus. The door 116', for example, has a front window glass 213 that is disposed on a window 140' hole on the inner side of a front panel 226 of a door case 208, which is located on the door 116' of the OTR oven. An attachment, such as an aluminum tape 217 is attached to the outer rim of the front window glass 213, and a gasket 218, such as an electromagnetic interference (EMI) gasket contacts the front panel 226 of the door case 208 as well as to the aluminum tape 217 on the side opposite from the heating chamber and facing the door panel 226 of the front window glass 213. The aluminum tape 217 conductively connects via the gasket 218 with the door case 208.

A wire mesh sheet 219 made of stainless steel or other like material is disposed on the inner side of the front window glass 213, and on the outer peripheral rim of the wire mesh sheet 219 is attached another adhesive 220, such as a copper tape that contacts the aluminum tape 217. The wire mesh sheet 219 is therefore conductively connected via the copper tape with the aluminum tape, for example.

A ferrite sheet 221 coming into contact with the copper tape 220 on the outer peripheral rim of the wire mesh sheet 219 is disposed in the inner rim of a window hole 209 on the outer side of a front wall of a door panel 207 of a groove in a door panel 207 on the door 116' of the oven. In addition, a ferrite sheet 224 is disposed on the outside of the door panel 207 that functions as a wave absorber for absorbing electric waves of the door case 208. Other sheets may also be implemented, but are not shown.

In one embodiment, a plastic layer 230, such as a biaxially-oriented polyethylene terephthalate or other durable plastic is disposed between the door case 208 and the front window glass 213. The plastic 230 is adhered to the glass 213 with an adhesion layer 232 that is an epoxy, glue, tape or other adherent material for bonding the plastic laminate material of the plastic 230 to a front surface of the glass 213 facing the door case 208. The plastic layer 230 is partially transparent and enables a user to at least partially see through the safety door and into the heating cavity 118 of FIG. 1, for example. The plastic layer 230 therefore laminates the outside surface of the front window glass 213 and functions to retain glass within the door 116'. In other certain embodiments, the plastic layer 230 is adhered to the opposite side of the glass 213 with the adhesion layer 232 between the back surface of the glass 213 facing the door panel 207 and the plastic 230 to adhere the plastic. Additionally, plastic may also be adhered to both sides of the glass 213, and thus, the disclosure is not limited one particular side or both sides of the glass 213 having a plastic layer adhered thereto. An advantage is that extreme breaks or collisions with the glass are kept from shattering to the outside of the microwave, but rather are contained within one piece that moves towards the direction of impact within the oven. The pieces of the glass may still shatter, as in the cases of tempered glass or heat strengthened glass, but instead of shattering in various directions based on the magnitude and direction of forces at impact, the glass is contained within the door regardless.

Figure 3:
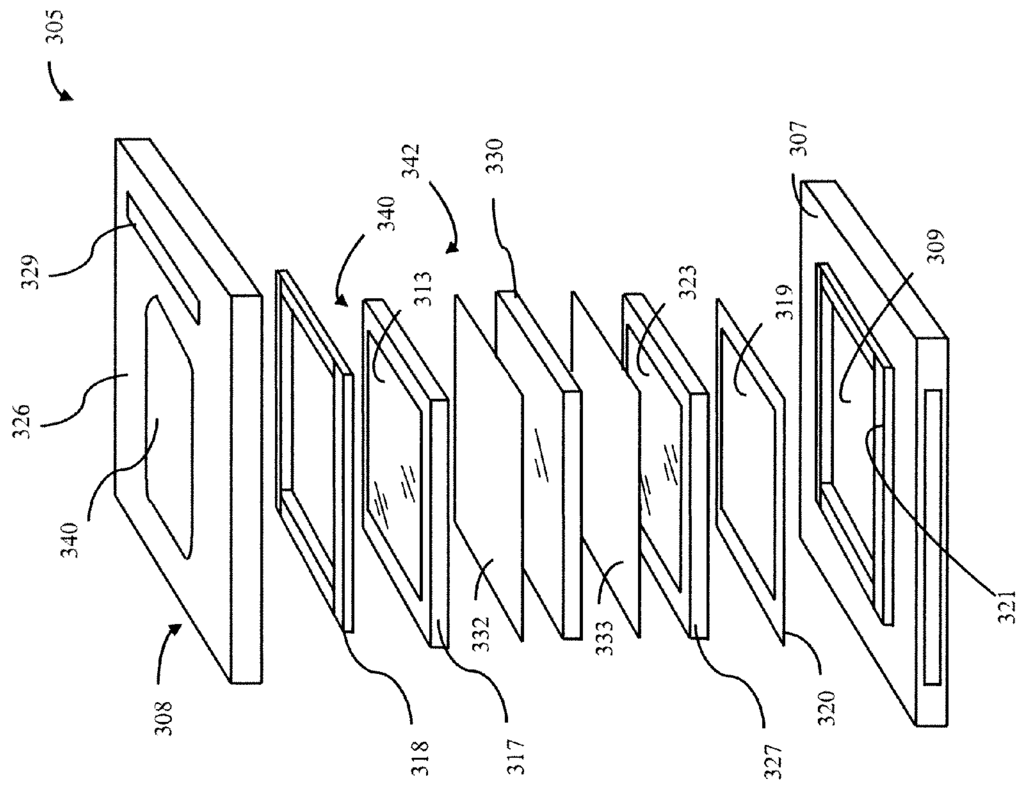
FIG. 3 is a perspective view show relevant portions of a safety door for an oven according to an exemplary aspect of the present disclosure.

FIG. 3 illustrates further aspects of the safety door 305 that has a first window glass 313 and a second window glass 323 that combines as an outer and inner door window through the window hole 340.

Similar to the safety door 116' of FIG. 2, the door 305 has glass for looking into a cooking cavity that may be transparent or translucent. The glass includes the first window glass 313 and the second window glass 323 disposed on a window hole 340 on the inner side of a front panel 326 of a door case 308, which is located on the door 305 of an oven. An attachment (e.g., Al tape 317 and 327) is attached to the outer rim of the first window glass 313 and the second window glass 323 respectively. At least one gasket 318, such as an electromagnetic interference (EMI) gasket resides within the door. The gasket 318 contacts the front panel 226 of the door case 208 as well as to the aluminum taping 317 and 323. A wire mesh sheet 319 is also disposed on the inner side of the second, inner window glass 327, and on the outer peripheral rim of the wire mesh sheet 219 is attached another adhesive 320. A ferrite sheet 321 contacts with the copper tape 320 on the outer peripheral rim of the wire mesh sheet 319 and is disposed in the inner rim of a window hole 309 on the outer side of a front wall of a door panel 307.

A plastic laminate layer 330 is disposed on the inner portion of the first window glass 313 and the outer portion of the window glass 323. Additional plastic layer are also envisioned and the present disclosure is not limited to only one, which is used for illustrative purposes in the figures herein. The plastic laminate 330 comprises a biaxially-oriented polyethylene terephthalate or other durable polyester film, which is used for high tensile strength, dimensional stability, transparency, gas and aroma barrier properties, electrical and mechanical insulation.

The first glass layer 313 has a first side 340 with a surface exposed to and facing outside the window hole 340 of the safety door 305. The layer 313 also has a second side 342 that is adjacent and opposite the first surface of the first side 340. At least one adhesion layer 332 is disposed to the second side 342 of the first window glass 313 in order to the plastic laminate 330. The adhesion layer 342 alternatively is disposed on the first side 313 of the first window glass 313 in order to bond the plastic layer to the first side 313 in addition to or instead of to the second side 342 as shown in FIG. 3. Other adhesion layers and plastic laminate layers bonded thereby are also envisioned to be on either side of the second window glass 323 in order to provide varying degrees of stability during breakage of the first and second window glasses. Further, a second adhesion layer (not shown) may be disposed laterally to the opposite side of the plastic laminate layer 330 for adhering to the second window glass 323 in order to retain both the first glass layer 313 and the second glass layer 323 within the door 305 during any kind of break within the glass window of the door 305. Additionally, other plastic layers may also be envisioned that are not shown in the example of FIG. 3 or herein. For example, a plastic layer may be bonded with an adhesion layer to both or either sides of first window glass 313 and/or to both or either sides of the second window glass 323. In other certain embodiments, the plastic layer 330 is adhered to both the first glass layer 313 and the second glass layer 323 with the adhesion layer 332 for the first glass layer 313 and another addition adhesion layer 333 at the opposite side of the plastic layer 330 for adhering to the second glass layer 323. Additionally, plastic may also be adhered to both sides of the first glass 313 as well as the second glass layer 323. The disclosure is not limited to any one side of the glass or combination of multiple plastic layers and glass layers within the door for providing a safety door. For example, each glass layer of the door may have a plastic layer adhered with an adhesion layer to both respective sides of the glass, as well as other configurations of plastic layers and adhesion layers with respect to each glass layer.

The first window glass 313 and the second window glass 323 are each partially translucent or partially transparent so that a user of the oven having the safety door 305 is able to view through into a heating cavity. The first window glass 313 and the second window glass 323 may also be transparent, or partially opaque. The glass of each window may be heat strengthened or tempered so that the glass shatters in small pieces, rather than in large sharp jagged spears. However, the disclosure is not limited to any one particular type of glass within the safety door 305. The first window glass 313 and the second window glass 323 may refract different colors and combine to provide one type of look for the oven by having a nuanced color of one type or multiple types depending upon consumer preferences. For example, the first window glass 313 may have a blue tint and the second window glass 327 may also have a blue tint or some other shade of color to provide a different nuanced color that emanates from the microwave for an aesthetic appeal.

Figure 4:
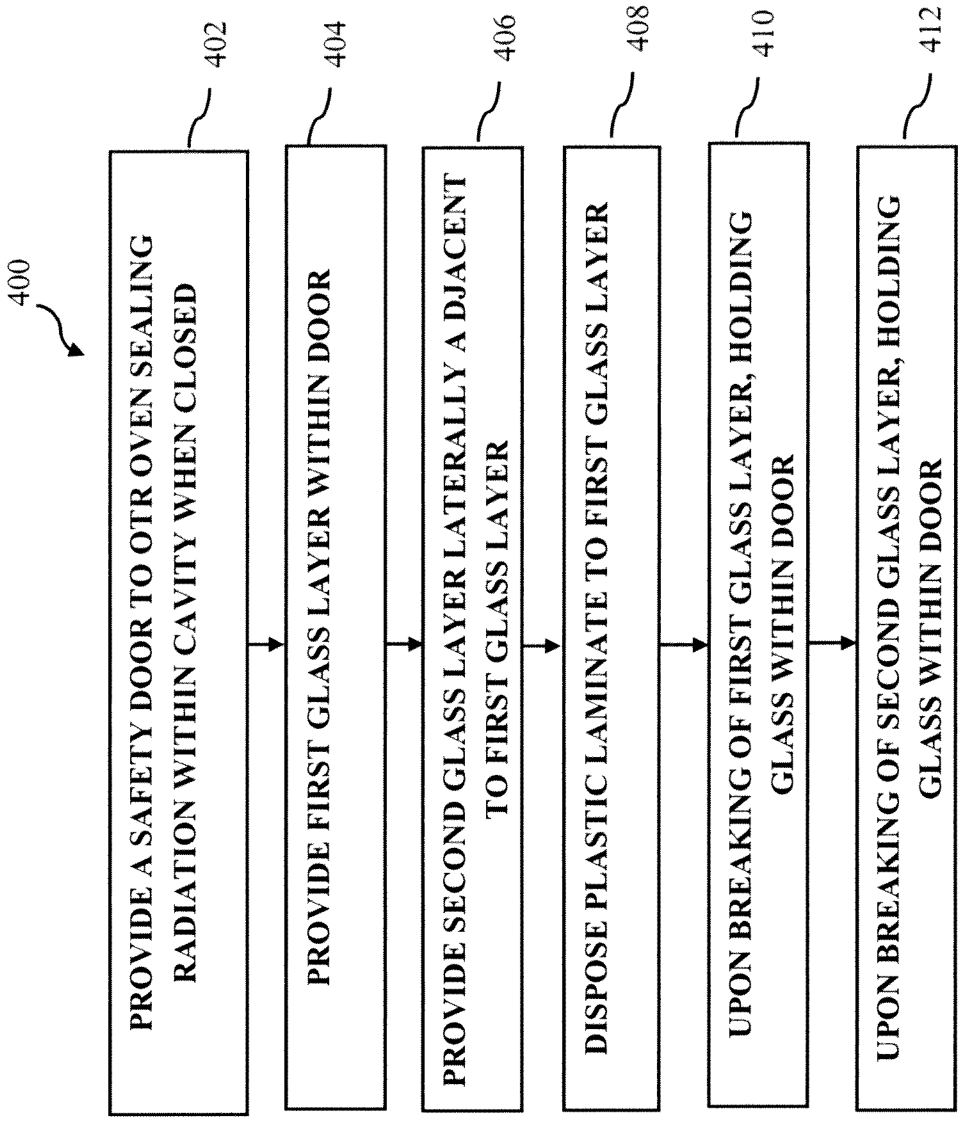
FIG. 4 is process flow for an oven according to an exemplary aspect of the present disclosure.

Example methodology 400 for an oven having a controller and a memory for executing the method is illustrated in FIG. 4. While the method is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

FIG. 4 illustrates a method 400 for an over-the-range (OTR) oven having a safety door to retain substantially all glass within the door and/or within the oven cavities under a breaking condition or when a break or fracture occurs in order to prevent injury outside the oven.

At 402 a safety door is provided to the OTR oven that seals radiation generated from a magnetron within a heating cavity upon closing.

At 404, a first glass layer is provided within the door that is at least partially transparent.

At 406, a second glass layer is provided that is laterally adjacent the first glass layer within the door and closer to the heating cavity of the oven.

At 408, a plastic laminate is disposed to the first glass layer to retain glass within the door or within the heating cavity from the first glass layer upon a break therein occurring.

At 410 upon a break occurring at the first glass layer, the glass of the layer is held in place within the door without having pieces fall into the microwave and/or outside of the microwave separately. At 412, upon a break occurring at the second glass layer the glass is held or retained within the door also.

In one embodiment, the plastic laminate is adhered to an outside surface of the first glass layer with an adhesion layer to retain glass from falling outside the door upon a break occurring. Alternatively, the plastic laminate is adhered to the first glass layer and between the first glass layer and the second glass layer.

In view of the forgoing discussion, while the concepts of a safety door have been presented in connection with ovens (e.g., the oven 100 and 100'), implementation of these concepts can extend to other appliances. Stoves, ranges, ovens, and other devices, which may not be outfitted with radiative elements such as magnetrons to facilitate cooking and preparation of food under safe conditions.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An apparatus, comprising:

a magnetron that provides radiation;

a heating cavity comprising a cavity wall with an opening exposing the heating cavity to the radiation for cooking an item therein; and a safety door providing access to the heating cavity for placing the item therein and having a glass window that is at least partially transparent to at least partially see within the heating cavity, wherein the glass window includes a first glass layer disposed on a front panel of the safety door, a second glass layer disposed on a rear panel of the safety door, and a plastic laminate bonding to at least one side of each of the first glass layer and the second glass layer, the plastic laminate disposed between the first glass layer and the second glass layer in the glass window, wherein the door is configured to retain substantially all glass of the glass window within the door and/or within the heating cavity at all times and during any break in the glass window.

2. The apparatus of claim 1, wherein the plastic laminate includes biaxially-oriented polyethylene terephthalate.

3. The apparatus of claim 1, wherein the apparatus comprises an over-the-range (OTR) microwave oven that includes a hood having an exhaust vent that ventilates air located underneath from a cooking source located therebelow.

4. The apparatus of claim 1, wherein the first glass layer includes a first side having a first surface that is exposed outside of the door of the oven and a second side that is opposite and laterally adjacent to the first side, and further contacts an adhesion layer on a first plastic laminate side of the plastic laminate to retain the first glass layer from falling outside the door when broken.

5. The apparatus of claim 4, wherein the plastic laminate of the glass window includes a second plastic laminate side opposite the first plastic laminate side that connects to the second glass layer.

6. The apparatus of claim 5, wherein the plastic laminate includes a second adhesion layer between the second plastic laminate side and the second glass layer that bonds the second glass layer to the second plastic laminate side to retain glass from falling into the microwave when the second glass layer is broken.

7. The apparatus of claim 1, wherein the plastic laminate is at least partially transparent with a visible color that provides the glass window with the visible color.

8. The apparatus of claim 1, wherein the plastic laminate includes biaxially-oriented polyethylene terephthalate.

9. The apparatus of claim 1, wherein the first glass comprises a heat strengthened glass that breaks into small pieces having sharp edges when broken.

10. An over-the-range (OTR) microwave oven, comprising:

a magnetron that provides radiation;

a heating cavity comprising a cavity wall with an opening exposing the heated cavity to the radiation for cooking an item therein;

a hood located underneath the heating cavity having an exhaust vent that ventilates air located underneath from a cooking source located therebelow; and a safety door providing access to the heating cavity for placing the item therein for heating and having a glass window that is at least partially transparent to at least partially see within the heating cavity, wherein the glass window includes a first glass layer located within a front panel of the door, a plastic laminate and a first adhesion layer bonding to the plastic laminate and the first glass layer to retain glass within the door at all times during any break in the glass window, the glass window further including a second glass layer located within a rear panel of the door adjacent the first glass layer and closer to the heating cavity, wherein the plastic laminate disposed between the first glass layer and the second glass layer in the glass window, the plastic laminate being bonded to at least one side of each of the first glass layer and the second glass layer.

11. The oven of claim 10, wherein the first glass layer comprises a first side having a first surface exposed to the outside of the oven and a second side that is adjacent and opposite the first surface having a second surface that is closer to the heating cavity than the first surface and is connected to the first adhesion layer.

12. The oven of claim 10, wherein the first glass layer comprises a first side having a first surface connected to the first adhesion layer that bonds the plastic laminate thereto and a second side adjacent and opposite the first that has a second surface closer to the heating cavity than the first surface.

13. The oven of claim 10, wherein the glass window further includes a second adhesion layer between the second glass layer and the plastic laminate and the first adhesion layer is located laterally between and connects the first glass layer and the plastic laminate to retain both the first glass layer and the second glass layer within the door during a break in the glass window.

* * * * *